United States Patent

Perkins

[15] 3,652,837
[45] Mar. 28, 1972

[54] AUTOMATIC WAYPOINT

[72] Inventor: Earl Stuart Perkins, Oak Brook, Ill.

[73] Assignee: Butler National Corporation, Oak Brook, Ill.

[22] Filed: May 13, 1969

[21] Appl. No.: 824,164

[52] U.S. Cl. ............235/150.27, 35/10.2, 235/150.26, 235/190, 343/107, 343/112 C
[51] Int. Cl. ..........................................G06g 7/78
[58] Field of Search..................343/107, 112 C; 35/10.2; 235/150.26, 150.27, 186, 189, 190

[56] References Cited

UNITED STATES PATENTS

| | | | |
|---|---|---|---|
| 2,599,889 | 6/1952 | Biggs et al. | 343/112 C UX |
| 2,848,160 | 8/1958 | Biderman | 235/190 |
| 2,881,992 | 4/1959 | Hecht et al. | 343/107 X |
| 3,013,723 | 12/1961 | Guarino | 235/150.27 |
| 3,090,958 | 5/1963 | Brown | 235/150.26 X |
| 3,215,823 | 11/1965 | Ariessohn et al. | 35/10.2 X |

*Primary Examiner*—Malcolm A. Morrison
*Assistant Examiner*—R. Stephen Dildine, Jr.
*Attorney*—Hill, Sherman, Meroni, Gross & Simpson

[57] ABSTRACT

An area navigation system which allows a waypoint to be set at any time to determine its bearing and distance from TACAN or VORDME station. When the automatic waypoint circuitry is on the coordinates of the aircraft are indicated in the rho and theta indicators at all times. When the pilot desires to set in a waypoint he can turn off the automatic waypoint circuitry and the area navigation system will operate with the coordinates of the waypoint set in at the time of switching and the position of the aircraft will then be indicated relative to the waypoint at all times.

14 Claims, 1 Drawing Figure

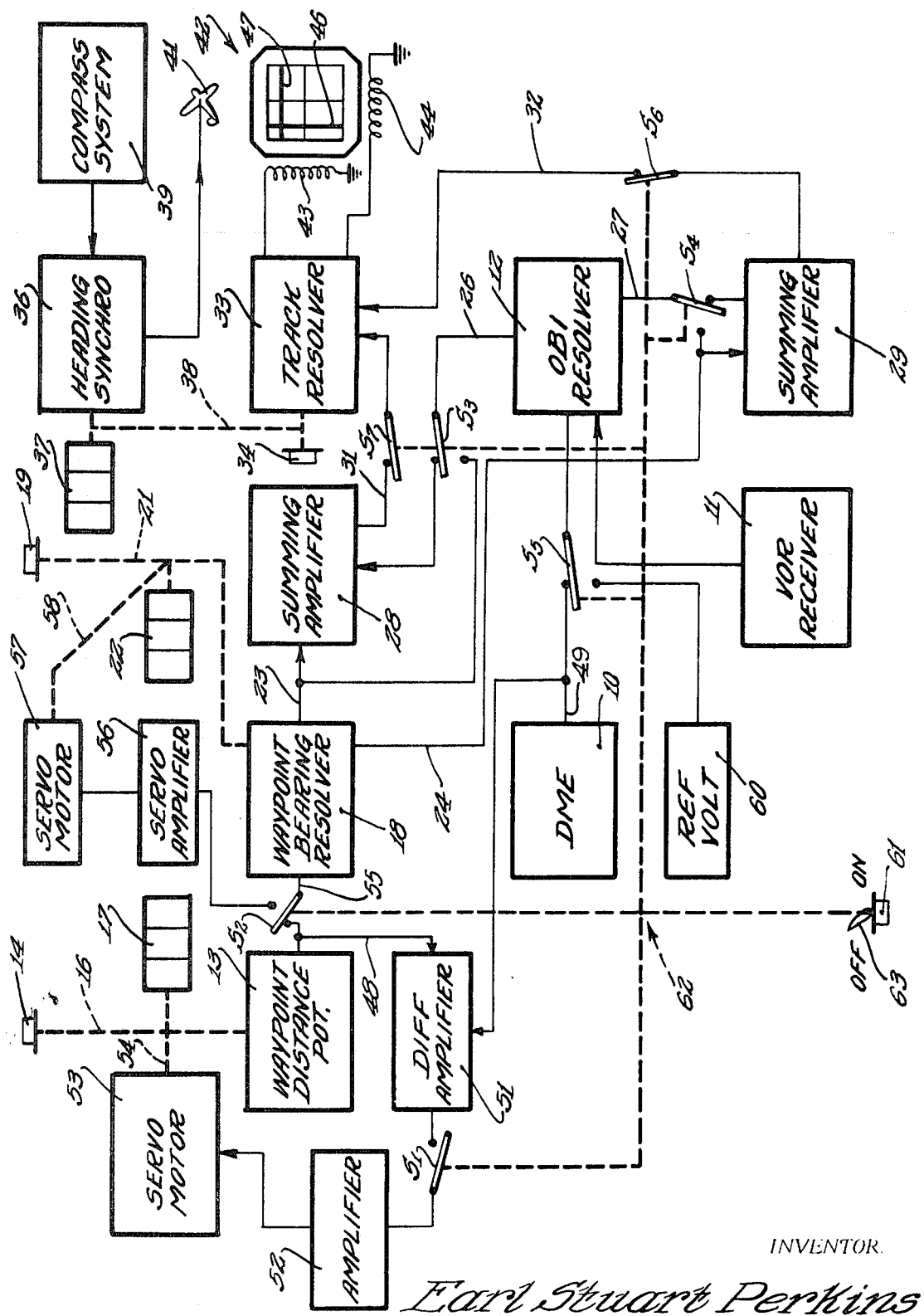

AUTOMATIC WAYPOINT

CROSS REFERENCES TO RELATED APPLICATIONS

This application is an improvement on the system described in U.S. Pat. No. 3,414,901 and application Ser. No. 705,202, filed Feb. 13, 1968, entitled "Navigation System," now U.S. Pat. No. 3,505,676.

BACKGROUND OF THE INVENTION

1. Field of the Invention

This invention relates in general to aircraft navigation systems and in particular to area navigation systems.

2. Description of the Prior Art

Area navigation systems in which a pilot may select any point as a waypoint rather than being limited to locations at which a navigation station is located are of great value in reducing the air traffic and navigation problems. As the number of aircraft have increased, the air space has become more and more crowded particularly in the vicinity of airports and on airways. Until recently, aircraft flew on "beams" or "radials," which pass through ground radio stations, or in the case of carrier operations, a transmitter located aboard ship. Such systems have caused aircraft to converge as they approach the radio station and has resulted in overcrowding of areas in the terminal areas and on cross-country flights. Area navigation systems allow aircraft to be successfully operated and navigated on lines passing through arbitrarily chosen "waypoints" which do not have ground base transmitters. This substantially increases the flexibility and utilization of the air space in that the number of waypoints becomes infinite as contrasted to a limited number of ground stations which have been previously used. Thus, airports which have no ground facilities or limited ground facilities may be utilized by setting the midpoint of the field as a waypoint by knowing the distance-bearing of the field from an existing field which has adequate radio facilities and aircraft can navigate and land on the waypoint field to substantially reduce traffic and congestion at the field with the radio facilities.

SUMMARY OF THE INVENTION

The present invention comprises an area navigation system which allows a pilot to operate in an "automatic waypoint" mode such that the selected waypoint is the aircraft's present position so that the waypoint and the aircraft's position coincide, until such time that the pilot desires to set in the waypoint which exists directly beneath the aircraft at a particular time. After this setting has been accomplished the distance and bearing to the selected waypoint will be continuously indicated and may be used for a number of purposes. For example, if an aircraft is searching for a downed aircraft, a searching aircraft may operate in the automatic waypoint mode until the position of the downed aircraft is detected. At the time the aircraft may be switched from automatic waypoint mode to set in the coordinates of the downed aircraft's position as the waypoint. Then as the searching aircraft leaves the position the indicated waypoint will be the downed aircraft's position which may be relayed to rescuers. In such an operation, for example, a helicopter with capability of landing near the downed aircraft may be given the coordinates of the downed aircraft's position as a waypoint which may be set into the area navigation system of the helicopter which may then fly to the downed aircraft's position and rescue may be accomplished.

Other and further objects, features and advantages of the present invention will become apparent to those skilled in the art from the following detailed disclosure thereof and the drawings attached hereto and made a part hereof.

DESCRIPTION OF THE DRAWING

The FIGURE illustrates the automatic waypoint area navigation system according to this invention.

DESCRIPTION OF THE PREFERRED EMBODIMENT

The FIGURE illustrates a DME receiver 10 and a VOR receiver 11 which are connected to omnibearing resolver 12 which resolves the distance of the aircraft into $x$ and $y$ Cartesian coordinates and supplies them to leads 26 and 27. A waypoint distance potentiometer 13 has an input shaft 16 with a knob 14 and an indicator 17 for supplying the rho coordinate of the waypoint into the system. The output of the waypoint distance potentiometer 13 is supplied to a waypoint bearing resolver 18 which has an input shaft 21 with a knob 19 and indicator 22 for setting in the theta bearing of the waypoint from the navigation station. The output of the waypoint bearing resolver is applied to leads 23 and 24 and gives the Cartesian coordinates of the waypoint relative to the navigation station. Summing amplifier 28 receives the $x$ components from the waypoint bearing resolver 18 and the omnibearing indicator resolver 12 and a summing amplifier 29 receives the $y$ components from resolvers 12 and 18. A track resolver 33 receives the $x$ signal from lead 31 out of the summing amplifier 28 and the $y$ signal from the amplifier 29 on lead 32. A situation presentation indicator 42 such as described in U.S. Pat. No. 3,414,901 has a $y$ needle 47 which is driven by the meter movement 43 and an $x$ needle 46 which is driven by the $x$ meter movement 44. An aircraft indicia 41 is rotatably mounted at the center of the indicator 42 and receives an input signal from the heading synchro 36 which is also connected to the compass system 39 of the aircraft. A knob 34 supplies an input 38 to the track resolver and to the heading synchro 36 and has an indicator 37.

A servo motor 52 has an output shaft 54 which is connected to shaft 16 and receives an input from an amplifier 52. A switch S1 is connected between the amplifier 52 and a differential amplifier 51. The differential amplifier 51 receives the output from the waypoint distance potentiometer 13 on lead 48 and an output on lead 49 from the DME 10. A servo 57 has an output shaft 58 connected to shaft 21 and receives an input from servo amplifier 56. Switch S1 is connected between the amplifier 51 and the amplifier 52. A switch S2 connects the output of waypoint distance potentiometer 13 to the waypoint bearing resolver 18 in a first position or the output of the waypoint bearing resolver 18 to the input of servo amplifier 56 in a second position. A switch S3 connects the output of the OBI resolver 26 to the summing amplifier 28 in a first position or connects lead 26 to lead 23 in a second position. A switch S4 connects the output of the OBI resolver lead 27 to the summing amplifier 29 in a first position or to lead 24 in a second position. A switch S5 connects the output of the DME 10 to the OBI resolver 12 in a first position or the input of the OBI resolver 12 to a reference voltage source 60 in a second position.

A switch S6 is in the line 32 at the output of the summing amplifier 29 and a switch S7 is in the output of the summing amplifier 28 in line 31.

A knob 61 has a pointer 63 which may be set to either off or on and the knob 61 is connected to linkages 62 which are connected respectively to switches S1 through S7. When the automatic waypoint knob 61 is in the off position as indicated in the FIGURE, the switches S1 through S7 are in the positions as shown in the FIGURE and when the knob 61 is moved to the on position the switches are in the reverse position as shown in the FIGURE.

In operation, to apply the system in a conventional manner, as disclosed in U.S. Pat. No. 3,414,901, knob 61 is turned to move the indicator 63 to off and the switches S1 through S7 will be in the positions as shown. The DME 10 and VOR receiver 11 are tuned to a selected ground station and if a waypoint is selected the distance from the ground station to the waypoint is set in by knob 14 as indicated in the indicator 17 and the bearing between the ground station and the waypoint is set in by the knob 19 and indicated in the indicator 22. The knob 34 controls the aircraft indicia 41 through the heading synchro 36 and the pilot may follow the guidance needles 46 and 47 to fly relative to the selected waypoint which is the point of intersection of the guidance needles 46 and 47.

To fly in the automatic waypoint mode knob 61 is turned so that the indicator 63 is set against on and the mechanical linkages 62 move the switches S1 through S7 for automatic waypoint. For example, the switch S1 connects the output of the differential amplifier 51 to the amplifier 52. The switch S2 connects lead 55 of the waypoint bearing resolver 18 to the servo amplifier 56. The switch S3 connects the output on lead 26 to lead 23, the switch S4 connects the lead 27 to the lead 24, switch S5 disconnects the input to the OBI resolver and connects it to the reference voltage 60. The switches S6 and S7 disconnect the inputs to the track resolver 33.

In this mode the difference amplifier 51 will indicate the difference between the setting of the DME output potentiometer appearing on lead 49 and the difference appearing on the waypoint distance pot 13 which is applied to lead 48. This difference will be amplified in the amplifier 52 and drive servo motor 53 in the correct direction so that output shaft 54 drives shaft 16, knob 14, indicator 17 and the waypoint distance potentiometer 13 until the output of the waypoint distance potentiometer balances the output of the DME. When this occurs the output of the difference amplifier 51 will be zero and the servo motor will stop. Thus, at this time the distance indicator 17 will indicate the distance of the aircraft from the DME station since the servo motor has balanced the output of the DME with the position of the waypoint distance potentiometer.

At the same time, the outputs of the OBI resolver 12 are supplied through switches S3 and S4 as inputs to the waypoint bearing resolver on leads 23 and 24. These inputs are supplied from lead 55 through switch S2 to the input of servo amplifier 56 which supplies an input to servo 57. Servo 57 drives shaft 21 and knob 19 and indicator 22 through shaft 58 and positions the waypoint bearing resolver 18 so that the theta read in indicator 22 corresponds to the bearing of the aircraft from the VOR receiver 11. It is interesting to note that the waypoint bearing resolver 18 is bilateral in that the normal mode with knob 61 turned to off that the lead 55 supplies an input to the resolver 18 and the outputs appear on leads 23 and 24. However, in the automatic waypoint "on" mode, inputs to the bearing resolver 18 are applied to leads 23 and 24 and the output is removed on lead 55 and supply the servo amplifier 56. When the automatic waypoint knob 61 is in the on position, the switches S6 and S7 disconnect the outputs of the summing amplifier to the track resolver and the guidance needles 46 and 47 will remain centered at the center of the instrument 42 to correctly indicate that the aircraft is at the waypoint which is continuously moving in this mode of operation.

The automatic waypoint mode is very useful when searches are being made, for example. Suppose, for example, that a downed aircraft is being searched for and the pilot has moved the knob 61 so that the indicator 63 is in the on position and has tuned in DME receiver 10 and VOR receiver 11 to a known ground station. The aircraft may be flown relative to the known ground station and the needles 46 and 47 will be centered and the distance to the DME station 10 will be continuously indicated on the indicator 17. At the same time the bearing between the aircraft and the VOR station will be indicated on the indicator 22. A prominent landmark may be selected as a reference point from which a search may be conducted. Thus, when the aircraft is directly over the prominent landmark as, for example, a mountain, the knob 61 may be moved from the on to the off position and the waypoint immediately becomes the position beneath the aircraft at the time the knob 61 is moved from the on to the off position. The aircraft may then conduct a search and the indicators 46 and 47 will present the position of the prominent landmark on the indicator 42. Thus, the aircraft may search a square pattern and cover the area in the vicinity of the selected waypoint. If the downed aircraft does not appear during the search about this prominent landmark, the pilot may turn the knob 61 to the on position and return to automatic waypoint and select another prominent landmark in an adjacent area about which a search may be made by picking it as a waypoint.

When the downed aircraft is located the pilot may select it as a waypoint and transmit by radio communication the downed aircraft's position to a rescuing helicopter, for example. The rescuing helicopter may set in the waypoint coordinates from the DME and VOR stations as relayed by the pilot in the craft which has found the downed plane.

Although the system has been described with respect to a downed aircraft it should be realized, of course, that it may be utilized to obtain the coordinates and position of an enemy gun implacement for example, which is to be attacked. The coordinates of the enemy's position may be transmitted to other aircraft or used by the searching aircraft to launch an attack upon the enemy position.

This invention provides means for automatically establishing a waypoint at any known location and although it has been described with respect to a preferred embodiment, it is not to be so limited as changes and modifications may be made therein within the full intended scope as defined by the appended claims.

I claim as my invention:

1. A navigation system for a craft having a waypoint computer for receiving radiant energy signals indicative of position such as distance and bearing and for computing the distance to a selected waypoint comprising:
   means for automatically establishing the coordinates of a selected waypoint; and
   means selectively connectable to said coordinate establishing means for producing the coordinate signals of the moving craft.

2. A navigation system according to claim 17 wherein said coordinate establishing means includes a waypoint distance means for establishing the distance between a ground transmitting station and a waypoint.

3. A navigation system according to claim 2 comprising means on said craft for determining the distance of the craft from said transmitting station, comparing means receiving outputs from the waypoint distance means and said means for determining the distance of the craft from said transmitting station, and first driving means receiving an input from said comparing means and connected to said waypoint distance means to set it to he distance of the craft from said transmitting station.

4. A navigation system according to claim 3 comprising an indicator connection to said waypoint distance means.

5. A navigation system according to claim 4 comprising means for manually setting the distance to the waypoint from the transmitting station connected to said waypoint distance means.

6. A navigation system according to claim 3 comprising means for disconnecting said first driving means from said waypoint distance means.

7. A navigation system according to claim 6 wherein said means for disconnecting said first driving means comprises a first switch connected in the input of said first driving means.

8. A navigation system according to claim 17 wherein said establishing means includes a waypoint bearing means for establishing the bearing between a ground transmitting station and a waypoint.

9. A navigation system according to claim 8 comprising means for manually setting the bearing of craft relative to the transmitting station.

10. A navigation system according to claim 8 comprising means on said craft for determining the bearing between said craft and said transmitting station and driving means connected to said waypoint bearing means to set it to the craft's bearing relative to the transmitting station.

11. A navigation system according to claim 10 comprising an indicator connected to said waypoint bearing means.

12. A navigation system according to claim 10 comprising means for disconnecting said driving means from said waypoint bearing means.

13. A navigation system according to claim 12 wherein said means for disconnecting said driving means comprises a switch in the input of said driving means.

14. A navigation system according to claim 1 comprising an indicator connected to the waypoint computer and indicating the craft's position relative to said waypoint and switching means for disconnecting said indicator from said waypoint computer when said means selectively connected to said coordinate establishing means produces the coordinates of the craft's position.

* * * * *